United States Patent [19]

Konagaya et al.

[11] Patent Number: 4,801,437
[45] Date of Patent: Jan. 31, 1989

[54] PROCESS FOR TREATING COMBUSTIBLE EXHAUST GASES CONTAINING SILANE AND THE LIKE

[75] Inventors: Yoshiaki Konagaya; Tooru Tanaka; Masami Takaine, all of Yokohama; Toshihiro Tsubouchi, Zama, all of Japan

[73] Assignee: Japan Oxygen Co., Ltd., Tokyo, Japan

[21] Appl. No.: 937,120

[22] Filed: Dec. 2, 1986

[30] Foreign Application Priority Data

Dec. 4, 1985 [JP] Japan .................................. 60-274121
Dec. 4, 1985 [JP] Japan .................................. 60-274122

[51] Int. Cl.$^4$ .............................................. C01B 33/12
[52] U.S. Cl. ..................................... 423/210; 423/336; 423/337
[58] Field of Search ......................... 423/210, 336, 337

[56] References Cited

U.S. PATENT DOCUMENTS

| | | | |
|---|---|---|---|
| 3,416,890 | 12/1968 | Best et al. ............................. | 423/336 |
| 3,419,351 | 12/1968 | Zirngibl et al. ....................... | 423/336 |
| 3,660,025 | 5/1972 | Driscoll ................................ | 423/336 |
| 3,661,519 | 5/1972 | Driscoll ................................ | 423/336 |
| 3,838,975 | 10/1974 | Tabak ................................ | 423/210 C |
| 3,853,506 | 12/1974 | Pircon ................................. | 55/91 |
| 3,920,422 | 11/1975 | Pircon ................................. | 55/90 |
| 3,954,945 | 5/1976 | Lange et al. ........................ | 423/337 |
| 4,108,964 | 8/1978 | Kratel et al. ........................ | 423/336 |
| 4,141,702 | 2/1974 | de Vries ............................. | 423/210 |
| 4,144,313 | 3/1979 | Germerdonk et al. ............. | 423/210 |
| 4,276,274 | 6/1981 | Heckel ................................ | 423/336 |
| 4,347,225 | 8/1982 | Audeh et al. ....................... | 423/210 |
| 4,444,735 | 4/1984 | Birmingham et al. .............. | 423/210 |
| 4,539,188 | 9/1985 | Hirsch et al. ....................... | 423/210 |
| 4,544,350 | 10/1985 | Ware, III et al. .................... | 423/210 |
| 4,555,389 | 11/1985 | Soneta et al. ....................... | 423/210 |
| 4,559,218 | 12/1985 | Flemmert ........................... | 423/337 |

FOREIGN PATENT DOCUMENTS 2923064 12/1980 Fed. Rep. of Germany ...... 423/337
2049641 12/1980 United Kingdom ............... 423/336

Primary Examiner—H. M. S. Sneed
Assistant Examiner—Helane Myers
Attorney, Agent, or Firm—Lowe, Price, LeBlanc, Becker & Shur

[57] ABSTRACT

The present invention relates to a process for treating combustible exhaust gases containing poisonous and combustible component gases such as silane and so on, and a combustion system therefor. In the combustion system, the combustible exhaust gases are burnt by downward flames generated from a coaxial, fourfold-pipe burner wherein the flow rates of primary and secondary air are regulated, thereby preventing fine particles of oxides such as silicon dioxide resulting from the combustion of silane, etc. from being deposited onto the nozzle of said burner and allowing deposites, if any, to peel off immediately. Thus, there is no fluctuation in the pressure of the a combustible exhaust gas path, so that constantly stable and continuous combustion is achieved with no difficulty. Removal of dust contained in the exhaust gases comprising fine particles of silicon dioxide, etc. is effected by adding water to the combustion gases and passing the resulting liquid through an orifice on the outlet side of which a pressure equal to or lower than the atmospheric pressure is maintained under a pressure difference across which is at least 2,500 mmAq, thereby trapping the dust in water.

7 Claims, 6 Drawing Sheets

PROCESS FOR TREATING COMBUSTIBLE EXHAUST GASES CONTAINING SILANE AND THE LIKE

FIELD OF THE INVENTION AND RELATED ART STATEMENT

The present invention relates to a process for making harmless waste gases containing poisonous and combustible component gases such as silane and the like discharged from the step of making semiconductors, and a combustion system for carrying out such a process.

For instance, the step of producing semiconductors discharges combustible exhaust gases containing various component gases such as silane ($SiH_4$), dichlorosilane ($SiH_2Cl_2$), germane ($GeH_4$), diborane ($B_2H_6$) arsine ($AsH_3$), phosphine ($PH_3$) and so on, which should be made harmless for discharging due to their toxicity. Since such component gases are self-burning or burnable, viz., combustible, they are burned with the use of a burner, followed by removal of dust contained in the exhaust gas resulting from combustion of the combustible exhaust gas.

One example of the method and apparatus for treating such toxic and combustible component exhaust gases is disclosed in U.S. Pat. No. 4,555,389. The prior art disclosed therein will now be explained with reference to FIG. 8.

FIG. 8 is a longitudinally sectioned view illustrating one example of the prior art combustible exhaust gas combustion apparatus. A hollow, cylindrical body 10, in which a combustion chamber is defined, is provided with an air inlet port 11 on its lower side and with a combustible combustion gas discharge port 12 on its top, said port 12 being in communication with a discharge system (not shown). A coaxial, double-pipe burner 13 extends upwardly through the body 10 from its bottom. A combustible exhaust-gas path 14 is defined within an inner pipe 13a of the burner 13, and an inert gas path 15 is formed between the inner and outer pipes 13a and 13b. Reference numeral 16 stands for a rectifier plate for rectifying a flow of air from the air inlet port 11 to the combustion-gas discharge port 12, and 17 indicates a view window for monitoring flames made of heat-resistant glass, which is interposed between flanges.

In the combustion apparatus as illustrated above, an amount of air admitted into the cylindrical body 10 from the air inlet port 11 is first discharged from the discharge port 12 to the discharge system (not shown) to form an upward flow of air within the body 10. Subsequently, the combustible exhuast gases containing gaseous silane and the like are fed from the step of preparing semiconductors to the combustible exhaust-gas port 14, while gaseous nitrogen is supplied to the inert gas path 15 as the inert gas. Thereupon, the silane gas burns immediately upon coming into contact with air owing to its self-burning property. However, the combustion of silane gas is somewhat retarded by the nitrogen gas acting as a gas curtain, so that, as illustrated in FIG. 8, the silane gas is lifted slightly up a nozzle of the burner 13 to produce flames 18 in a position spaced away from the nozzle end. The resulting exhaust gas is then discharged with the aforesaid air from the discharge port 12 to the discharge system (not shown), in which dust is removed from the exhaust gas. It is understood that the dust is formed by the aforesaid combustion in the combustion gas, and occurs in the form of fine particles of oxides. For instance, the combustion converts silane/dichlorosilane, germane, diborane, arsine and phosphine to silicon dioxide ($SiO_2$), germanium dioxide ($GeO_2$), boron oxide ($B_2O_3$), arsenic oxide ($As_2O_3$) and phosphorus pentoxide ($P_2O_5$), respectively. The dust is individually of less or reduced toxicity. If the dust is discharged as such to the atmosphere, however, then it has an adverse influence, as represented by pneumoconiosis, upon the human body and poses problems in view of environmental pollution and health. This is the reason why the dust is removed from the exhaust gas in the discharge system, as already mentioned. In accordance with the combustion method relying upon the foregoing apparatus, upward combustion is applied to form the flames 18 above, since, for instance, silicon dioxide in the form of fine particles produced as combustion takes place moves upwardly and floats there. In fact, the flames 18 are lifted using an inert gas to form them off the nozzle with a view to avoiding deposition of silicon dioxide to the nozzle end of the combustible discharge gas path 14 of the burner 13, which may otherwise cause clogging of the nozzle.

Removal of dust contained in the exhaust combustion gas is carried out in a dry manner wherein a bag filter is used, or a wet manner wherein the dust is trapped in water, followed by solid-liquid separation using suitable separation means. In the conventional wet manner, trapping of dust in water is effected by the so-called underwater bubbling wherein the dust is brought in contact with water by bubbling a dust-containing gas in water or the so-called showering wherein the dust is brought in contact with water droplets by passing a dust-containing gas through showered water.

However, the prior art method has the following disadvantages.

(1) In the combustion of silane gas, the flames 18 are lifted to avoid deposition of silicon dioxide resulting from that combustion onto the nozzle of the combustible discharge gas path 14 of the burner 13. The fact is, however, that convection, etc. occurring within the cylindrical body 10 cause gradual deposition of silicon dioxide onto the nozzle with the lapse of time. Once such deposition takes place, it proceeds to such a degree that the combustible exhaust-gas path 14 is eventually clogged due to the burner 13 directing upward. After a while, the deposits peel off. This phenomenon occurs repeatedly. Peeling-off of the deposits causes a pressure fluctuation in the combustible exhaust gas path 14, which not only has an adverse influence upon the step of producing semiconductors, but is also responsible for incomplete combustion, since lump deposits of silicon dioxide, peeling off the nozzle due to the upward direction of burner 13, fall into the combustible exhaust gas path 14 and reduce the width thereof.

(2) When use is made of the structure whereby the dust contained in the exhaust gas is caught in water for its removal, the conventional combustion system has to include an external mixer device for mixing water with the exhaust gas; this giving rise to inconveniences in view of installation space and cost.

(3) Since the exhaust gas has a high temperature so that the cylindrical body 10 per se assumes a high temperature, for instance, it is dangerous to monitor the flames through the view window 17. For that reason, it is required that the cylindrical body 10 be covered with an insulating material, or be added therein with water, so as to limit an increase in the temperature of the body 10.

(4) The conventional combustion apparatus is designed to prevent deposition of silicon dioxide onto the inner wall surface of the cylindrical body 10 by an upward flow of air therein. However, such a preventing effect is so insufficient that an amount of silicon dioxide is still deposited onto the inner wall surface. Particularly because the flames direct upward, an increased amount of silicon dioxide is deposited onto an upper portion of the cylindrical body 10. Upon the deposition reaching a certain amount, the deposits peel down out of the cylindrical body 10 due to their own weight and convection, etc. occurring therein, and strike upon the burner 13 to disturb combustion.

(5) When removing the dust contained in the exhaust gas by trapping it in water, the conventional method makes it possible to trap a portion of the dust having a particle size of at least 0.1 micronmeter, since there is a fair chance for that portion to contact water. However, when the particle size of dust is 0.1 micron or less or particularly 0.05 microns or less, there is a considerable drop of its removal rate. That is, in the case of the bubbling technique, the fine dust particles as mentioned above are entrained in air bubbles produced at the time of the injection of gas into water with no chance of contacting water, and cannot therefore be removed. The showering technique also makes it impossible to remove fine dust particles, since there is only a limited chance of contacting mists of injected water.

For the aforesaid reasons, it has generally been considered difficult to trap fine dust particles in water. For instance, when silane gas is burnt and, afterward, silicon dioxide ($SiO_2$) produced by the combustion of silane gas and contained in the resulting exhaust gases is trapped in water and treated therein, difficulty is encountered in trapping the silicon dioxide in water in the conventional manner, since the particle size of the silicon dioxide just after combustion is substantially 0.05 microns at most. Accordingly, it is required that the exhaust gases be stored for a certain period of time to grow the particles of dust, which are then to be trapped in water. A separate tank for storing the exhaust gas is required to this end, and incurs inconveniences in view of installation area and cost.

OBJECT AND SUMMARY OF THE INVENTION

The present invention has for its object to obviate the aforesaid inconveniences. According to the present invention, that object is achieved by generating combustion flames downwardly.

According to one aspect of the present invention, there is provided a process for treating combustible exhaust gas containing poisonous and combustible component gases such as silane gas and the like, said process being characterized in that, within an apparatus through which air is passed at a flow rate of at least 0.5 m/sec from above to below, combustible exhaust gases, an inert gas, primary air and secondary air are downwardly fed through a coaxial, fourfold pipe provided with an innermost combustible exhaust gas path, an inert gas path, a primary air path and an outermost secondary air path to form downward flames for combustion, the flow rate of said primary air being 2 to 10 m/sec., and the flow rate of said secondary air being 1.0 to 2.5 times that of said primary air, and the dust contained in the exhaust gases resulting from said combustion is removed.

Thus, since the combustible exhaust gases containing silane and the like are burned with the coaxial, fourfold-pipe burner to form downward flames, the following objects and effects are achieved.

(1) It is possible to reduce the amount of deposition of fine dust such as silicon dioxide resulting from combustion onto the burner's nozzle.

(2) Even though the fine dust is partly deposited onto the burner's nozzle, there is no fear of clogging of the combustible exhaust gas path, since the deposits fall down spontaneously due to the pressure of gas and their own weight. Hence, since no fluctuation is found in the pressure prevailing in the combustible exhaust gas path, there is no adverse influence upon combustible exhaust gas discharge sources such as the step of making semiconductors.

(3) Further, even though dust deposits peel off the inner wall surface of the combustion system and fall down, it is unlikely that they may strike upon the burner's nozzle. It is thus possible to maintain stable combustion.

(4) Of the dust contained in the exhaust gases, even dusts having a particle size of 0.1 micron or less, or 0.05 micron or less can be removed by adding water to the exhaust gases and passing them through an orifice under the given conditions. It is thus possible to capture in water even silicon dioxide having a particle size of 0.5 microns or less just after the combustion of silane gas. For that reason, any separate exhaust gas storing tank for growing the dust can be dispensed with. In addition, since ordinary means such as valves or fine tubes can be used as the orifice through which the gas-liquid two-phase flow passes, the system according to the present invention can easily be constructed, and is of high serviceability.

According to another aspect of the present invention, there is provided a combustion system for combustible exhaust gases containing silane gas and the like, which is characterized by comprising a hollow, cylindrical body having at its upper portion an air inlet port and a at its bottom a exhaust gas discharge port to communicate with a discharge system and a coaxial, fourfold-pipe burner which is downwardly open and is disposed within said cylindrical body, said burner being provided with an innermost combustible exhaust gas path for passing therethrough said combustible exhaust gases, an inert gas path, a primary air path and an outermost secondary air path.

Thus, since the exhaust gases can be burned with the coaxial, fourfold-pipe burner, while properly controlling the flow rates of the primary and secondary air, the following objects and effects are achieved.

(5) It is possible to form stable downward combustion flames and thereby maintain effective combustion.

(6) Since downward combustion flames can be formed according to the present invention, a water spray tube can be installed within the system without supressing such flames.

According to a third aspect of the present invention, there is provided a combustion system for combustible exhaust gases containing silane and the like, characterized in that a water spray tube is provided below the open portion of the coaxial, fourfold-pipe burner disposed within the combustion system.

Hence, the following objects and effects are achieved by the provision of the water spray tube.

(7) Cooling of the combustible exhaust gases can be carried out within the combustion chamber, so that any separate combustible exhaust gas cooling installation is dispensed with.

(8) In the case where the present invention is applied to the technique according to which, after mixing water with the exhaust gases, fine dust contained therein in the form of solid oxides is trapped in water for removal, that mixing can be effected within the hollowl, cylindrical body. Thus, any separate water mixer device is dispensed with, resulting in savings of installation space and cost.

(9) During cooling of the exhaust gases, the hollow cylindrical body per se is cooled. Thus, it is unncessary to provide that body with any insulating material. Nor is any separate water-pouring installation needed for cooling that body.

(10) If water jets from the water spray tube are allowed to flow on the inner wall surface of the hollow, cylindrical body, it is then unlikely that silicon dioxide may be deposited onto said inner wall surface. This makes maintenance work such as cleaning of said inner wall surface easy. Even though silicon dioxide is deposited onto a upper portion of the hollow, cylindrical body which water does not contact, peels off and then falls down, the combustion system according to the present invention can operate without any difficulty, and ensure more stable combustion.

BRIEF DESCRIPTION OF THE DRAWINGS

FIG. 9 is a centrally longitudinal section showing the conventional combustion system.

DETAILED DESCRIPTION OF PREFERRED EMBODIMENTS

The embodiments of the present invention will now be explained with reference to FIGS. 1 to 7.

Figure 1:
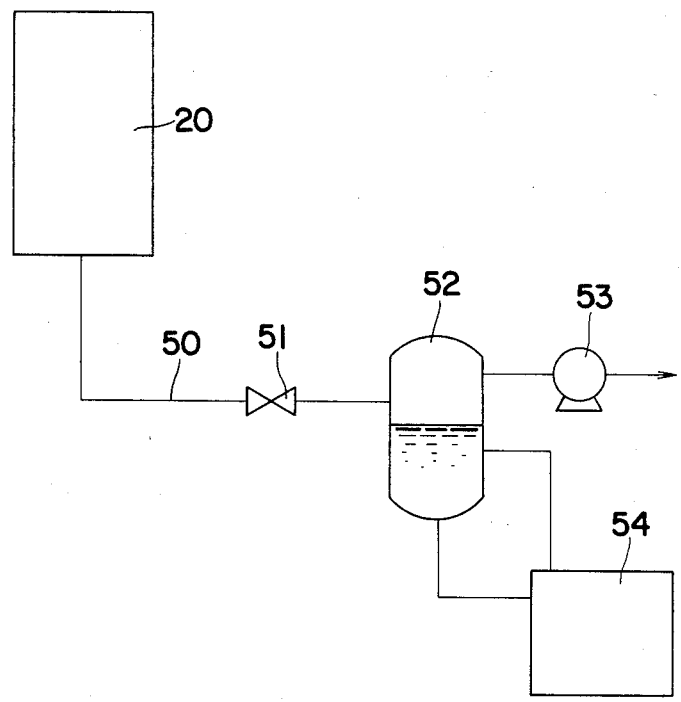
FIG. 1 is a flow sheet for illustrating the process of the present invention.
Figure 2:
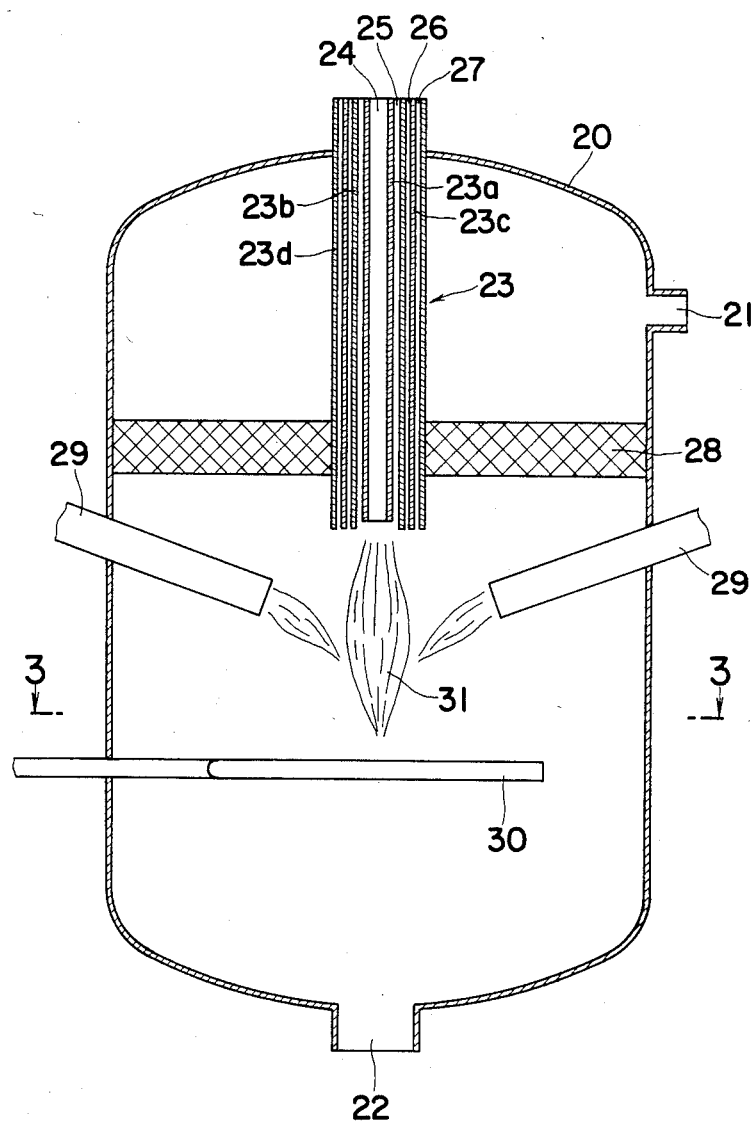
FIG. 2 is a centrally and longitudinally sectioned view showing one embodiment of the combustion system according to the present invention.

Referring first to FIG. 1, reference numeral 20 stands for a hollow cylindrical body in which a combustion chamber is defined. As illustrated in FIG. 2, the body 20 is provided with an air inlet port 21 on its upper side and a exhaust gas discharge port 22 at its bottom. A discharge pipe 50 extends from the exhaust gas discharge port 22, and terminates in a vacuum pump 53 by way of an orifice-forming valve 51 and a gas-liquid separator 52. To the separator 52 is connected a filter press 54.

Figure 5:
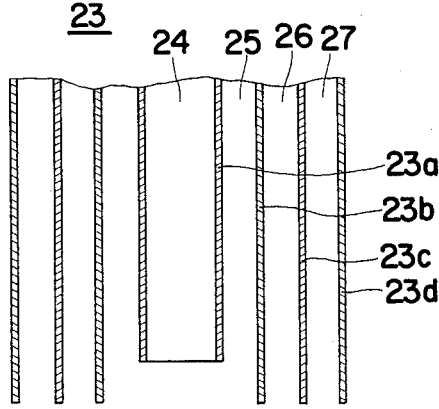
FIG. 5 is an enlarged, longitudinally sectioned view showing one example of the nozzle of the burner.

As illustrated in FIG. 2, a coaxial, fourfold-pipe burner 23 extends downwardly through the cylindrical body 20 from its top. As illustrated in FIGS. 2 and 5, the burner 23 includes an innermost or first pipe 23a for defining an combustible exhaust gas path 24, a second inner pipe 23b for defining an inert gas path 25 in cooperation with the first pipe 23a, a third inner pipe 23c for defining a primary air path 26 in cooperation with the second pipe 23b and an outermost or fourth pipe 23d for defining a secondary air path 27 in cooperation with the third pipe 23c. As best seen from FIG. 5, the top of the first inner pipe 23a is located somewhat inside of the top of the second inner pipe 23b.

A rectifier plate 28 is provided to rectify an amount of air admitted through the air inlet port 21, and is formed of a perforated plate such as a punched plate. That plate is positioned such that the cylindrical body 20 is divided into upper and lower portions, and is permitted to serve as a holder for the burner 23 by passing the downward burner 23 therethrough. Provision is also made of an ignition source 29 such as a pilot burner which is constantly at work. It is noted that at least one ignition source is used so as to maintain flames 31 at a suitable position below a nozzle of the burner 23.

Figure 3:
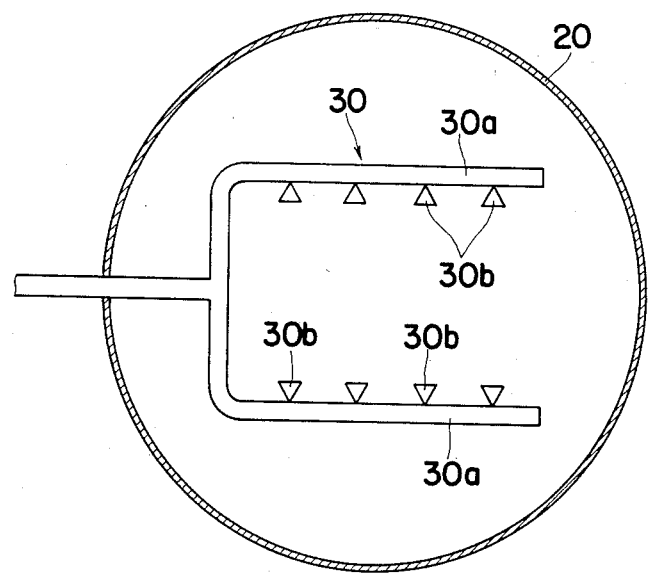
FIG. 3 is a sectional view taken along the line 3—3 of FIG. 2, showing one example of the water spray tube.

A water spray tube 30 is provided in such a manner that it is positioned below the flames 31 generated below the burner 23 and, as best seen from FIG. 3, is of a U-shaped plane and positioned horizontal. The opposite tube portions 30a and 30a of the water spray tube 30 are provided on their insides with a number of water injection nozzles 30b adapted to inject water horizontally or downwardly.

The combustion system of the present invention as constructed above operates as follows.

First of all, a fuel gas such as propane is fed to the pilot burner 29 for ignition, while an amount of air is discharged from the air inlet port 21 to an exhaust pipe 50 by way of the combustion-gas discharge port 22 to form a downward flow of air within the cylindrical body 20.

It is then desired that the flow rate of air is at least 0.5 m/sec. At a lower flow rate of air, difficulty is encountered in discharging fine dust comprising silicon dioxide, etc. from the system, since it tends to be blown up within the cylindrical body 20 owing to its lightness.

Subsequently, the combustible exhaust gases containing silane, etc. from the semiconductor production step, the inert gas such as a nitrogen gas and air are passed through the combustible exhaust gas path 24, the inert gas path 25 and the primary/secondary air paths 26/27, respectively. The respective gases are then injected from the associated nozzles in parallel, and the combustible exhaust gases are ignited by the flames of the pilot burner 29. The exhaust gases are then burned in a position slightly below the lower ends of the nozzles of the burner 23 by the curtain action of the nitorgen gas fed from the inert gas path 25, as illustrated in FIG. 2, thereby spreading the flames 31.

The reason for spacing the flames 31 downwardly from the respective nozzles of the burner 23 is to avoid deposition of finely particulate silicon dioxide produced at the time of combustion of silane gas contained in the combustible exhaust gases. In order to spread the flames 31 as mentined above and achieve stable combustion, it is essentially required that the flow rate of the primary air be 2–10 m/sec. depending upon the components and flow rate of the combustible exhaust gases passing through the combustible exhaust gas path 24, and the flow rate of the secondary air be 1.0–2.5 times that of the primary air. More specifically, if the flow rate of the primary air is 2 m/sec. or less, the flame zone is then spread or broadened out under the influence of the flames ' own floatage, so that the flames are unstable and decrease in temperature, thus leading to incomplete combustion. If the flow rate of the primary air is 10 n/sec. or more, there is then an inconvenience that, the flames are blown off to such a degree that the combustion is disturbed, when the amount of the combustible exhaust gases is reduced or limited.

The secondary air serves to form the flame zone into a rod- or bar-like shape and maintain the flames at a high temperature for combustion. It is desired to that end that the flow rate of the secondary air is equivalent to 2.5 times or less that of the primary air. This is because, when the flow rate of the secondary air is lower than that of the primary air, difficulty is involved in the stable maintenance of the flame shape or zone, while, at a flow rate of the secondary air being more than 2.5 times that of the primary air, the flames are blown off, when the amount of the exhaust gases are reduced or limited.

The high-temperature exhaust gases resulting from the combustion caused by the thus formed flames 31 go down together with the aforesaid air streams and, in the course of its descent, is cooled by water jets injected through the water nozzles 30b of the water spary tube 30 to pass it into a gas-liquid double phase. Then, the exhaust gases flow from the exhaust gas discharge port 22 into the discharge pipe 50 forming part of the discharge system, in which the dust is removed from the exhaust gases.

Figure 8:
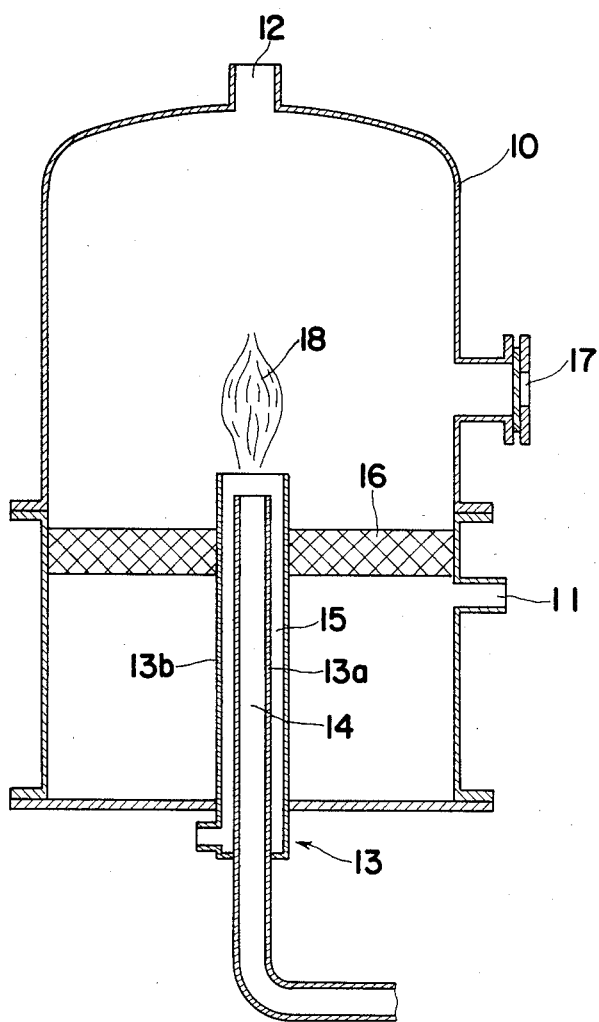

Thus, the present invention, wherein the flow rates of air passing through the primary and secondary air paths 26 and 27 are properly adjusted by the coaxial, fourfold-pipe burner 23, constantly allows silane gas to flame forth downwardly within the cylindrical body 10 and slightly below the lower end of the burner 23, thus leading to efficient combustion. In other words, even though the downward flames as contemplated in the present invention are formed only with the conventional combustion system of FIG. 8 upside down, the flames are broadened out into an unstable state by their own floatage, resulting in a decrease in their temperature and, hence, incomplete combustion.

In the foregoing embodiment, it is to be understood that the pilot burner 29 is provided to constantly maintain stable flames, even though there are variations in the concentration of silane gas contained in the combustible exhaust gases discharged from the step of producing semiconductors. Provision of such a pilot burner may not be needed, where silane gas is always contained in the combustible exhaust gases in such an amount that it is self-burning. In actual combustible exhaust gases, however, the concentration of silane gas varies, and may fall below the self-burning concentration. Usually, it is thus desirable to use such a pilot burner.

Figure 4:
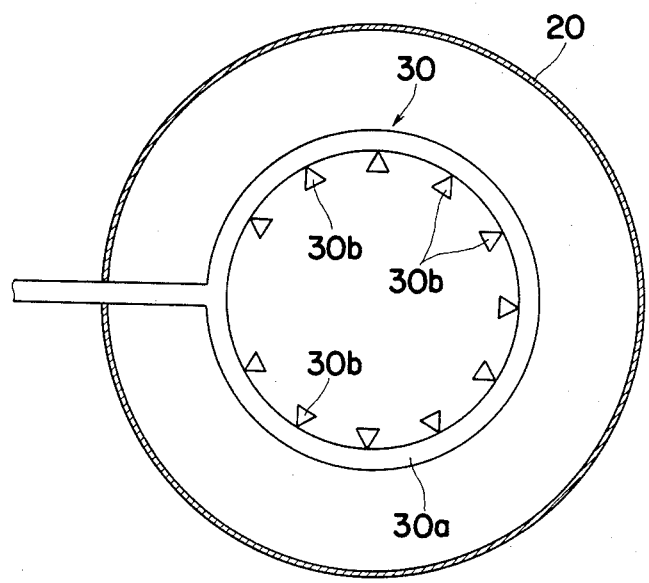
FiG. 4 is a sectional view taken along the line 3—3 of FIG. 2, showing another example of the water spray tube.

While the foregoing embodiment has been described as arranging the water spray tube within the combustion system, it goes without saying that an external exhaust gas cooling system may additionally be provided in the absence of the water spray tube 30. However, the provision of the water spray tube 30, as applied in the foregoing embodiment, makes it possible to cool not only the exhaust gas but to cool the cylindrical body 10 at the same time. Although the water spray tube 30 provided in the foregoing embodiment is of the U-shape as illustrated in FIG. 3, it may be of a ring shape, for instance, as shown in FIG. 4, or of any other shape if only to allow the space where the flame 31 is generated. No particular limitation is placed upon the positions of the water-jetting nozzles 30a to be provided in the water spray tube 30. However, it is convenient in view of maintenance to locate them in such a manner that water is horizontally jetted in the centripetal direction, since the thus injected water then flows down, while contacting the inner wall surface of the hollow cylindrical body 20, to clean out said inner wall surface and result in prevention of deposition of silicon dioxide thereonto. It is a matter of course that care is taken to prevent water from contacting the flames so as to maintain them at higher temperatures.

The present invention is not necessarily limited to the vertical arrangement of the burner 23, as described in the foregoing embodiment. The same results as mentioned above are obtained, even if the burner 23 is arranged at any angle with the proviso that the flow rates of the primary and secondary air are maintained within the aforesaid flow rate conditions. In the first embodiment, the burner 23 can securely be held in place owing the structure that it is passed through and fixed by the rectifier plate 28. The rectifier plate 28 serves to rectify the air admitted through the air inlet port 21 and feed it downwardly, thus making a contribution to the formation of stable flames. To add to this, its bottom face acts as a shield for preventing a slight amount of dust blown up during the combustion of combustible exhaust gases from being deposited onto the inner face of a portion of the cylindrical body 20 positioned thereabove, thus making the maintenance easy. It may be possible to form satisfactory flames without recourse to the rectifier plate 28 and achieve the original object of the present invention, i.e., the treatment-by-combustion of combustible exhaust gases. In the absence of the rectifier plate 28, however, it is required to fix the burner 23 to the open top end of the cylindrical body 20 with sufficient strength. It is also a matter of course that the effect as already mentioned is not obtained in connection with maintenance. With these in mind, the provision of the rectifier plate 28 is desired.

In the first embodiment, one air inlet port 21 is provided in an upper portion of the barrel forming the cylindrical body 20. However, more satisfactory flames are easily obtained, if a number of air inlet ports are formed around and in the barrel of the cylindrical body 20 at the same height as that of said air inlet port 21. In one example of the air inlet port to be provided in the upper portion of the barrel of the cylindrical body 20 as in FIG. 7, that body 20 is divided into an upper top end portion 20a and a barrel portion 20b, the former being held on the latter by means of a suitable holder to define therebetween a suitable gap acting as an air introduction portion 21a. Another example of the burner for generating the flames 31 downwardly for stable combustion will now be explained with reference FIG. 6.

Figure 6:
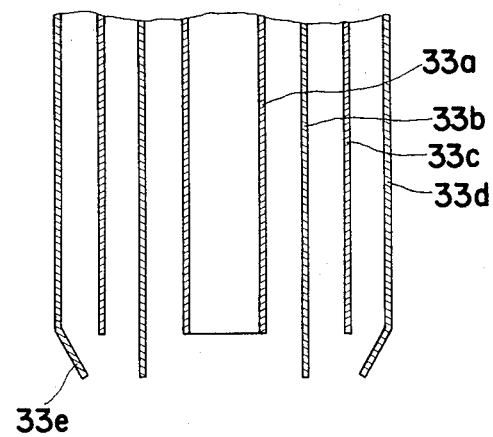
FIG. 6 is an enlarged sectional view showing another example of the nozzle of the burner.
Figure 7:
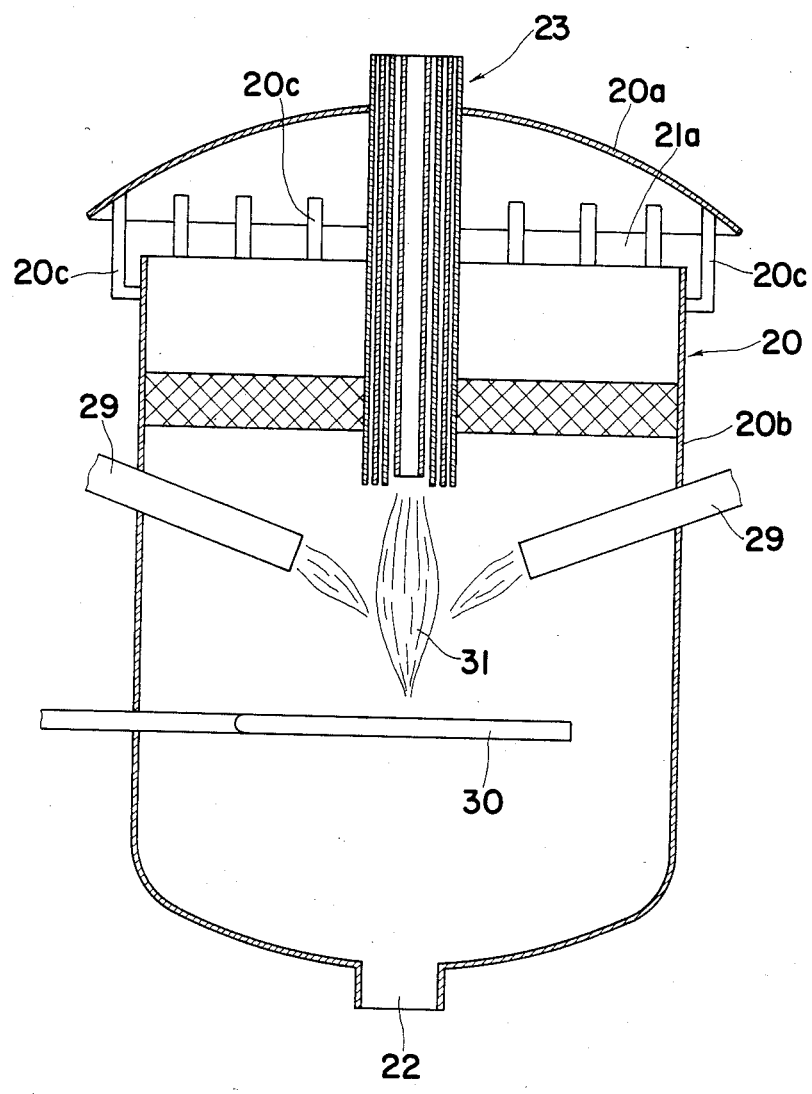
FIG. 7 is a centrally and longitudinally sectioned view showing another embodiment of the combustion system according to the present invention.

FIG. 6 is a centrally longitudinal section of a burner generally indicated at 33, which is enlarged in the vicinity of an associated nozzle. The burner 33 is a coaxial fourfold structure comprises an innermost pipe 33a, a second inner pipe 33b, a third inner pipe 33c and an outermost pipe 33d, and is basically of a structure similar to that of the burner 23 of FIG. 5, but is different therefrom in the third inner pipe 33c and outermost pipe 33d. More exactly, the open end portion of the third inner pipe 33c is positioned inwardly of the open end portions of the second inner pipe 33b and outermost pipe 33d, and the open end portion 33e of the outermost pipe 33d is converged toward the center of the burner 33. Where the burner 33 takes on the shape as illustrated in FIG. 6, the combustible exhaust gases, nitrogen gas, primary and secondary airs injected from the associated nozzles are converged by the secondary air toward the center of the burner 33, so that the resulting flames tend to be smaller in size and higher in temperature than those obtained with the burner 23 of FIG. 5, resulting in more efficient combustion. In both the burners of FIGS. 5 and 6, more preferable results are obtained, if acute tapers are given to the ends of the pipes forming the nozzle portions of the combustible exhaust gas and inert gas paths to make silicon dioxide deposition hard to occur and render silicon dioxide deposits, if any, easy to peel off.

Explanation will now be made of the embodiment of the process for removing the dust contained in the exhaust gases by trapping it in water with reference to the flow sheet of FIG. 1.

Operation of the vacuum pump 53 causes finely powdered silicon dioxide-containing combustible exhaust gases and water to be sucked in a gas-liquid two-phase through the exhaust gas discharge port 22 provided at the bottom of the cylindrical body 20 forming part of the combustion system and to be then passed through the valve 51. Suitable adjustment of the opening of the valve 51 defines an orifice in and through which the two-phase flow is vigorously agitated and injected. In this case, if the pressure on the outlet side of the valve 51 is made equal to or lower than the atmospheric pressure and a pressure difference across the valve 51 is equal to or higher than 2,500 mmAq, then a portion of silicon dioxide having a particle size of 0.05 micronmeters or less is mixed with and trapped in water during said agitation.

Subsequently, the silicon dioxide-containing liquid is admitted into the gas-liquid separator 52, and is then filtered in the filter press to give out the silicon dioxide in the solid form. The gas phase contained in the exhaust gases is sucked as such in the vacuum pump 53, and is afterward discharged to the atmosphere.

According to the present invention as described above, it is possible to trap in water even silicon dioxide of less than 0.05 micronmeters or less occurring immediately after the combustion of silane.

It is to be understood that while the valve 51 is used as the orifice for passing the gas-liquid phase flow therethrough in the foregoing system, similar effects are obtained even though a fine tube is employed as the orifice.

EXPERIMENTS

Reference will now be made to experiments carried out according to the flow sheet of FIG. 1.

Gases containing substantially equal amounts of silane, hydrogen and nitrogen and having a flow rate of 10 lN/min were burned in the hollow, cylidrical body 20, to which water was then added through the water spray tube 30. Thereafter, the resulting liquid was passed through the valve 51, the opening of which was adjusted to vary the pressure on the outlet side thereof. Observation was then made of white fumes contained in the gases discharged from the vacuum pump 53. The results are set forth in the following table.

TABLE

| Inlet Pressure of Valve 51 (mmHg) | Outlet Pressure of Valve 51 (mmAq) | Results of Observation of Gases Discharged from Vacuum Pump 53 |
|---|---|---|
| −5 | −2,000 | Considerable Amount of White Fumes |
| −5 | −2,500 | Small Amount of White Fumes |
| −5 | −3,000 | Slight Amount of White Fumes |

TABLE-continued

| Inlet Pressure of Valve 51 (mmHg) | Outlet Pressure of Valve 51 (mmAq) | Results of Observation of Gases Discharged from Vacuum Pump 53 |
|---|---|---|
| −5 | −3,500 | No White Fumes |

From the above results, it has been found that fine powders having a particle size of 0.05 micronmeters or less can almost satisfactorily be trapped in water with the valve 51 being somewhat closed at a reduced outlet pressure of −2,500 mmAq or less and in a pressure difference of at least 2,500 mmHg thereacross.

It is to be understood that while the above experiments were carried out with fine silicon dioxide dust, similar results were obtained with germane oxide, boron oxide and so on.

What is claimed is:

1. A process for the complete combustion of an exhaust gas comprising toxic gases capable of combusting into solid products, comprising
   passing the following four gases downwardly and coaxially through four concentric hollow conduits of a combustion chamber from the innermost to the outermost:
   (I) an exhaust gas comprising toxic gases capable of combusting into solid gas,
   (II) an inert gas,
   (III) a primary stream of air having a flow rate of about 2 to 10 m/s, and
   (IV) a secondary stream of air having a flow rate of about 1 to 2.5 times the rate of the primary stream of air;
   providing a flame source in the vicinity of, and below, the lower end of said concentrical conduits so that when a flame forms at the flame source, said flame is formed downwardly by said down flowing exhaust gas which is thereby combusted into solid products in the form of a dust; said downward flame being separated from said lower end of said conduits by said stream of inert gas, stabilized by said primary stream of air and shaped as a rod by said secondary stream of air;
   forcing a downward flow of atmospheric air inside said chamber at a rate of at least 0.5 m/sec. to carry said dust and prevent its deposition onto, and clogging of, said lower end of said conduits; and
   removing said combusted gas and said solid products from the lower portion of said chamber.

2. The process of claim 1, further comprising providing said chamber with a source of water at a point below the flame and in the path of said combusted gas, so that when said water is mixed with said combusted gas it entraps said solid products in the form of dust;
   passing said mixture through an orifice after removing said combusted gas-water mixture from said chamber while maintaining an up to and about atmospheric pressure on the outlet side of said orifice and a pressure difference across said orifice of about 2,500 mmAq or higher.

3. The process of claim 2, wherein
said water is provided in the form of a water spray.

4. The process of claim 3, wherein
said water spray is a plurality of water sprays.

5. The process of claim 2, wherein
said solid products have a particle size of about 0.1 micron or less.

6. The process of claim 5, wherein
said solid products have a particle size of about 0.05 micron or less.

7. The process of claim 1, wherein
said toxic gases are selected from the group consisting of $SiH_4$, $B_2H_6$, $SiH_2Cl_2$, $GeH_4$, $AsH_3$, $PH_3$ and mixtures thereof.

* * * * *

UNITED STATES PATENT AND TRADEMARK OFFICE
CERTIFICATE OF CORRECTION

PATENT NO.   : 4,801,437
DATED        : January 31, 1989
INVENTOR(S)  : Yoshiaki Konagaya et al It is certified that error appears in the above-identified patent and that said Letters Patent is hereby corrected as shown below:

Column 9, in the Table, line 63, "Valve 51 (mmHg)" should be --Valve 51 (mmAq)--.

Column 10, Table-continued, line 4, "Valve 51 (mmHg)" should be --Valve 51 (mmAq)--.

Column 10, line 12, "2,500 mmHg" should be --2,500 mmAq--.

Signed and Sealed this

Eighth Day of May, 1990

Attest:

HARRY F. MANBECK, JR.

*Attesting Officer*    *Commissioner of Patents and Trademarks*